(No Model.)
D. M. LAMB.
ELECTRIC BATTERY.
No. 461,027. Patented Oct. 13, 1891.
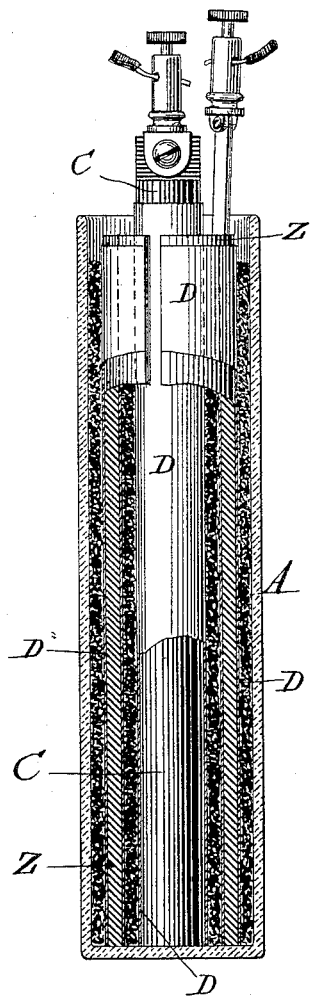
Witnesses
Inventor
Daniel M. Lamb
by his attorneys

UNITED STATES PATENT OFFICE.

DANIEL MARTIN LAMB, OF BOSTON, MASSACHUSETTS.

ELECTRIC BATTERY.

SPECIFICATION forming part of Letters Patent No. 461,027, dated October 13, 1891.

Application filed May 26, 1891. Serial No. 394,156. (No model.)

*To all whom it may concern:*

Be it known that I, DANIEL MARTIN LAMB, a citizen of the United States, residing at Boston, in the county of Suffolk and State of Massachusetts, have invented certain new and useful Improvements in Electric Batteries, of which the following is a specification.

The electrodes of many classes of electric batteries being in direct contact with the exciting fluid or active material employed are apt to be corroded or clogged and to have their action obstructed by the deposits thereon.

The objects of my invention are to prevent deterioration of the electrodes from such causes and to secure the development of a continuous and uniform electro-motive force or strength of battery. These ends I attain by enveloping the electrodes in an absorbent or permeable material, by employing active material having its granules individually or separately coated with water-repellent material, and by the employment of a neutral exciting-fluid, such as water.

The accompanying drawing represents a side elevation, partly in vertical central section, of a battery-cell adapted to the practice of my invention, any desired strength of battery being obtained by coupling together a suitable number of such cells.

Unless otherwise indicated the parts are of usual approved construction.

The drawing shows a cell A, containing a longitudinally-slotted open-ended tubular zinc electrode Z, preferably of a height slightly less than that of the cell and of somewhat smaller diameter, so as to leave an annular space between them. A carbon-rod C, of smaller size but greater length than the zinc electrode, is inserted therein, so as to leave an annular space between them. The carbon electrode and both surfaces of the zinc electrode are coated, covered, or enveloped with absorbent or permeable fibrous or textile material D, such as cloth, flannel, canton-flannel, felt, or paper. Preferably I use the strongest and heaviest filtering-paper obtainable, apply it closely to the surfaces of the electrodes, and secure it thereto by the application of adhesive water-repellent material, such as gum-shellac varnish.

I prefer to employ active material the essential ingredients of which consist of black oxide of manganese, sal-ammoniac, sulphate of copper, and a bichromate, such as that of potash or of soda, one or more of the other ingredients being mingled with the black oxide of manganese and a resinous water-repellent material, such as rosin, all these ingredients being pulverized, mixed, heated sufficiently to melt the rosin, and thoroughly stirred while thus heated, the result being the production of a mass of granular active material, having each of its granules or particles enveloped with water-repellent material. The preparation of this active material is fully set forth in another application filed by me simultaneously herewith, Serial No. 394,155, and is accordingly not claimed herein.

The spaces between the electrodes and between the cell and outer electrode are filled with this active material nearly up to the top of the zinc electrode, and the cell is filled up to about the top of said electrode with water, which constitutes the exciting-fluid of the battery. This fluid readily reaches the surface of the electrodes through their absorbent envelopes, while the active material granules, being enveloped in water-repellent material, are prevented from dissolving, and the envelope prevents the contact of such material with the surface of the electrodes and keeps them clear from obstruction, thus maintaining the uniform force or tension of the battery.

I claim herein as new and as of my own invention—

1. The combination, substantially as hereinbefore set forth, in an electric battery, of granulated active material, the particles of which are separately enveloped in water-repellent material, electrodes, envelopes therefor of absorbent or permeable material, and an exciting-fluid.

2. The combination, substantially as hereinbefore set forth, in an electric battery, of granulated active material, a resinous water-repellent substance individually enveloping each granule, a neutral exciting-fluid, such as water, electrodes immersed therein, and envelopes therefor of absorbent paper to protect the electrodes from obstruction.

In testimony whereof I have hereunto subscribed my name.

DANIEL MARTIN LAMB.

Witnesses:
WM. D. BALDWIN,
LLOYD B. WIGHT.